US007755004B2

(12) United States Patent
Collene et al.

(10) Patent No.: US 7,755,004 B2
(45) Date of Patent: Jul. 13, 2010

(54) MOTORIZED HINGE SYSTEM FOR OVEN DOOR

(75) Inventors: James J. Collene, Nevada, OH (US); Jeffrey D. Habegger, Wadsworth, OH (US); Brian S. Studer, Shelby, OH (US); Nicholas R. SirLouis, Medina, OH (US)

(73) Assignee: Mansfield Assemblies Co., Mansfield, OH (US)

( * ) Notice: Subject to any disclaimer, the term of this patent is extended or adjusted under 35 U.S.C. 154(b) by 357 days.

(21) Appl. No.: 11/786,889

(22) Filed: Apr. 13, 2007

(65) Prior Publication Data

US 2007/0267401 A1 Nov. 22, 2007

Related U.S. Application Data

(60) Provisional application No. 60/792,042, filed on Apr. 14, 2006.

(51) Int. Cl.
*F24C 15/02* (2006.01)
*A21B 3/02* (2006.01)

(52) U.S. Cl. ....................................... 219/391; 126/192

(58) Field of Classification Search ....................... None
See application file for complete search history.

(56) References Cited

U.S. PATENT DOCUMENTS

| | | | | | |
|---|---|---|---|---|---|
| 1,858,503 | A | * | 5/1932 | Hollman | 126/340 |
| 3,009,458 | A | * | 11/1961 | Pearce | 126/340 |
| 3,059,634 | A | * | 10/1962 | Brinkman et al. | 126/337 R |
| 4,340,799 | A | | 7/1982 | Ueda et al. | |
| 4,450,335 | A | | 5/1984 | Shimizu et al. | |
| 4,884,556 | A | | 12/1989 | Alden et al. | |

(Continued)

FOREIGN PATENT DOCUMENTS

| | | |
|---|---|---|
| EP | 0 541 974 | 11/1995 |

(Continued)

OTHER PUBLICATIONS

Appliance Magazine article titled *Motorized Oven Door* published Jul. 2005.

(Continued)

*Primary Examiner*—Joseph M Pelham
(74) *Attorney, Agent, or Firm*—Fay Sharpe LLP

(57) ABSTRACT

A motorized hinge system for an oven door includes first and second hinge assemblies. At least one hinge assembly is motorized. In the motorized hinge assembly, a first hinge portion is connected to the oven door and a second hinge portion connected to the oven body. A door control arm has first end connected to the first hinge portion and a second end spaced from the first end. A motor is connected to the oven body and includes an actuator that is driven by the motor. The actuator is operably coupled to the door control arm and is movable in first and second directions by the motor to move the door control arm and door in corresponding first and second directions pivotally relative to the second hinge portion. In one example, the actuator is a lead screw type actuator. A non-motorized hinge assembly is also used together with the motorized hinge assembly to connect the oven door to the body. The non-motorized hinge assembly is spring-biased to urge the door toward its closed position.

16 Claims, 11 Drawing Sheets

U.S. PATENT DOCUMENTS

| | | | |
|---|---|---|---|
| 5,375,587 | A | 12/1994 | Ward et al. |
| 5,546,773 | A | 8/1996 | Lee |
| 5,566,508 | A | 10/1996 | Houston |
| 5,735,007 | A | 4/1998 | Choi |
| 5,742,964 | A | 4/1998 | Choi |
| 5,778,705 | A | 7/1998 | Lee |
| 6,679,572 | B2 | 1/2004 | Sears |
| 7,064,296 | B1 | 6/2006 | Harned et al. |
| 2002/0088800 | A1 * | 7/2002 | Miller ........................ 219/700 |
| 2003/0079413 | A1 * | 5/2003 | Fukumoto et al. ............. 49/341 |
| 2004/0027248 | A1 | 2/2004 | Lile |
| 2004/0144380 | A1 | 7/2004 | Grutzke et al. |
| 2004/0231655 | A1 | 11/2004 | Kuttalek et al. |
| 2004/0231656 | A1 | 11/2004 | Kuttalek et al. |
| 2004/0255929 | A1 | 12/2004 | Miller et al. |
| 2004/0261784 | A1 | 12/2004 | Kuttalek |
| 2005/0005927 | A1 | 1/2005 | Kuttalek |

FOREIGN PATENT DOCUMENTS

| | | |
|---|---|---|
| EP | 1 248 046 | 10/2002 |
| GB | 2 350 863 | 12/2000 |
| GB | 2 409 896 | 7/2005 |

OTHER PUBLICATIONS

Dooraway.com website pages, copyright 2005.

* cited by examiner

MOTORIZED HINGE SYSTEM FOR OVEN DOOR

CROSS-REFERENCE TO RELATED APPLICATION

This application claims priority from and benefit of the filing date of U.S. provisional patent application Ser. No. 60/792,042 filed Apr. 14, 2006 (Apr. 14, 2006) which is hereby expressly incorporated by reference into the present specification.

BACKGROUND

It has been deemed desirable to provide an oven with a power operated door that opens and closes automatically under power in response to user input to a control system rather than by manual force applied to the door by the user. A power operated oven door system must be safe, reliable, cost effective and easy to use if it is to be commercially successful.

SUMMARY

In accordance with one aspect of the present invention, a motorized hinge system for an oven door includes a first hinge portion adapted to be connected to an associated oven door and a second hinge portion adapted to be connected to an associated oven body. The first portion is pivotally connected to the second portion. A door control arm has a first end connected to the first hinge portion and a second end spaced from the first end. A motor is adapted to be connected to the associated oven body, the motor including an actuator that is driven by the motor and operably coupled to the door control arm. The actuator is movable in a first direction by the motor to move the door control arm and the first hinge portion in a first direction pivotally relative to the second hinge portion, and movable in a second direction by the motor to move the door control arm and the first hinge portion in a second direction pivotally relative to the second hinge portion.

In accordance with another aspect of the present invention, an oven includes a body with a cooking chamber. A door is pivotally connected to the body by first and second hinge assemblies and movable between opened and closed positions relative to the cooking chamber. The first hinge assembly includes a motorized hinge system including:

a first hinge portion connected to the door;

a second hinge portion connected to the oven body, the first portion pivotally connected to the second portion;

a door control arm having a first end connected to the first hinge portion and a second end spaced from the first end;

a motor connected to the oven body, the motor comprising an actuator that is driven by the motor and operably coupled to the door control arm, the actuator movable in a first direction by the motor to move the door control arm and the door in a first direction pivotally relative to the body, and movable in a second direction by the motor to move the door control arm and the door in a second direction pivotally relative to the body.

DETAILED DESCRIPTION

Figure 1A:
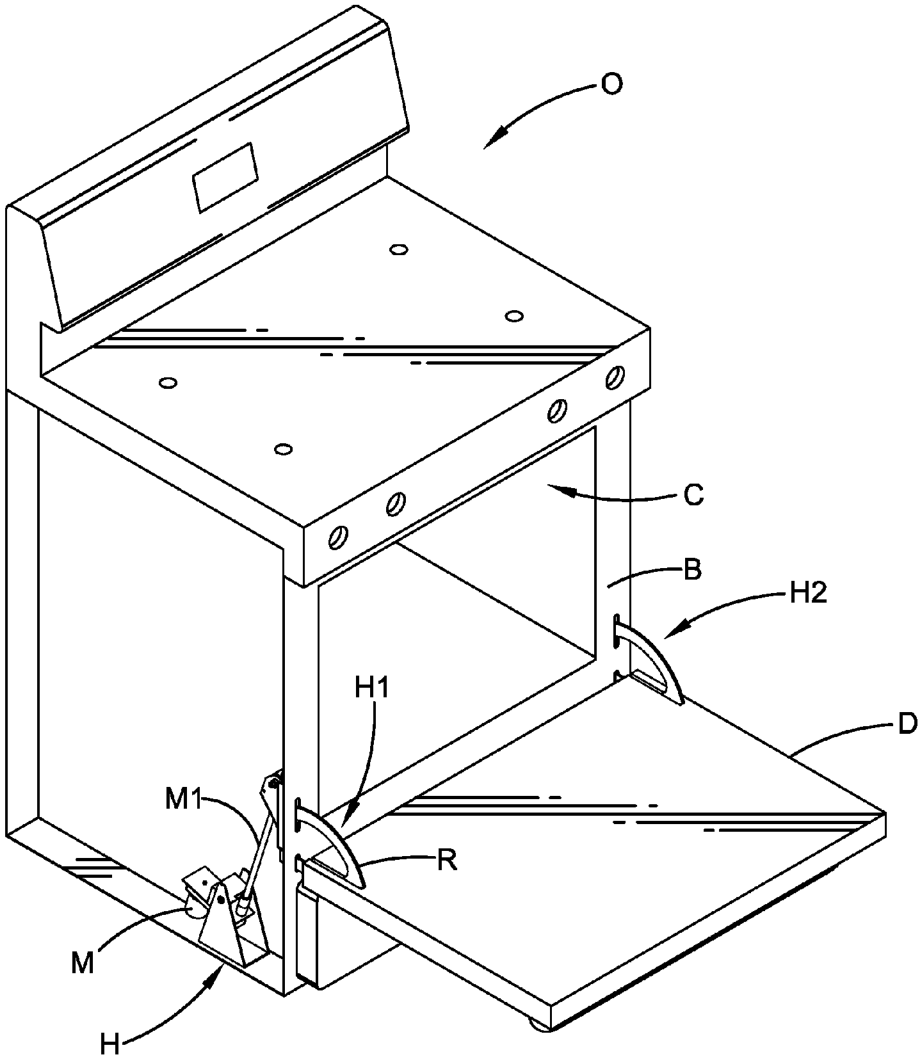
FIG. 1A is an isometric view of an oven including a door with a motorized hinge system provided in accordance with the present invention, with the oven door open and a left side panel of the oven removed or made transparent to reveal certain aspects of the present development.
Figure 1B:
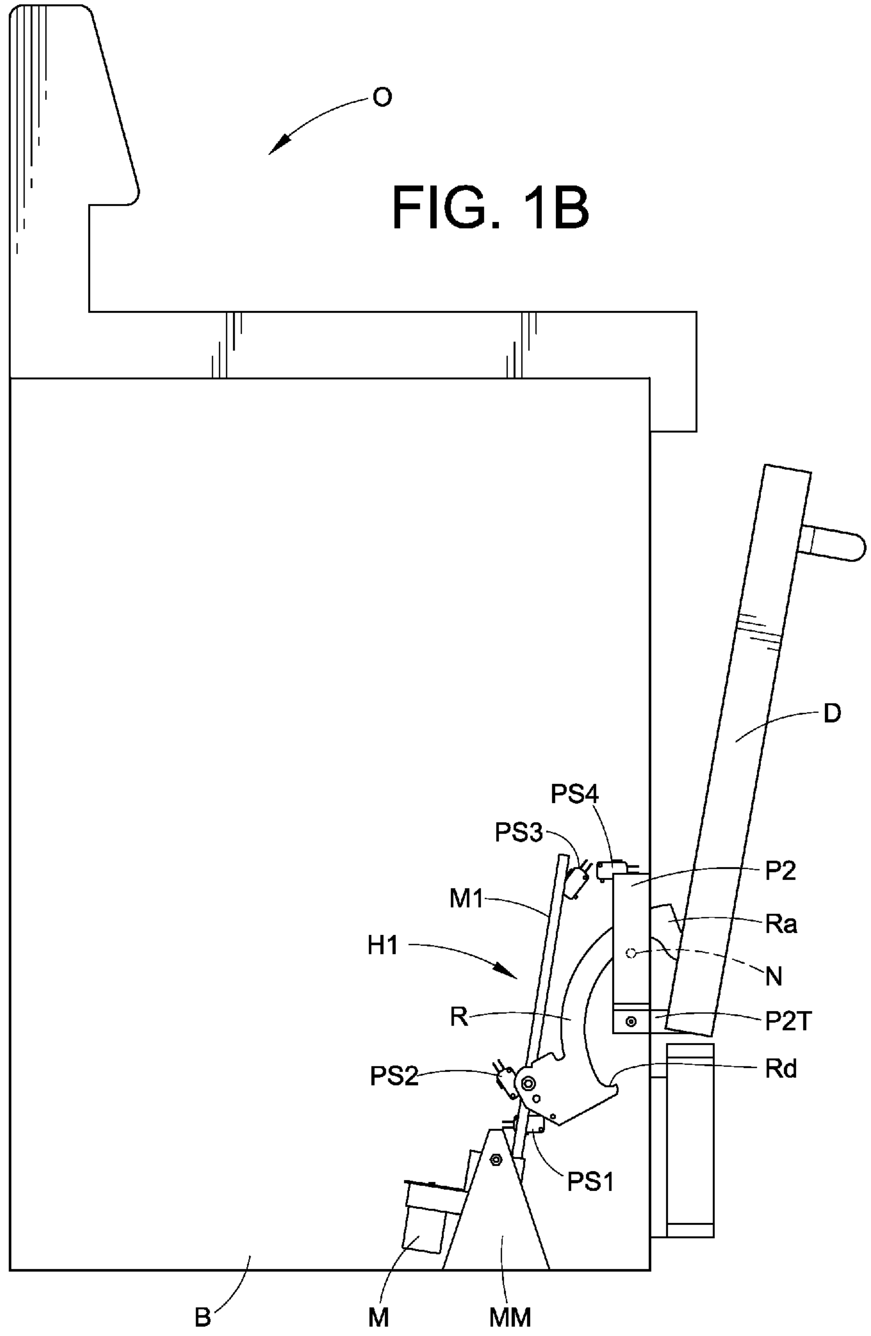
FIG. 1B is a left side view of the oven of FIG. 1A showing the door in a partially opened "broil" position, again with the left side panel of the oven removed or made transparent to reveal underlying structures.

FIG. 1A is an isometric view of an oven O including a door D with a motorized hinge system H provided in accordance with the present invention, and FIG. 1B provides a left side view with the door D only partially opened. The oven O includes a body B defining a chamber C for cooking. Selective access to and sealing of the chamber C is provided by the door D that is pivotally connected to the body B by the motorized hinge system H including left (first) and right (second) hinge assemblies H1,H2 located on opposite left and right lateral sides of the body and door, respectively. The door D pivots about a horizontal axis relative to the body B between a closed (vertical) position where the door closes and seals the chamber C, and a range of opened (non-vertical) positions that provide access to the chamber C. In FIG. 1, the oven door D is opened and a left side panel of the oven is removed or made transparent to reveal the structure and function of the left hinge assembly H1.

Figure 2:
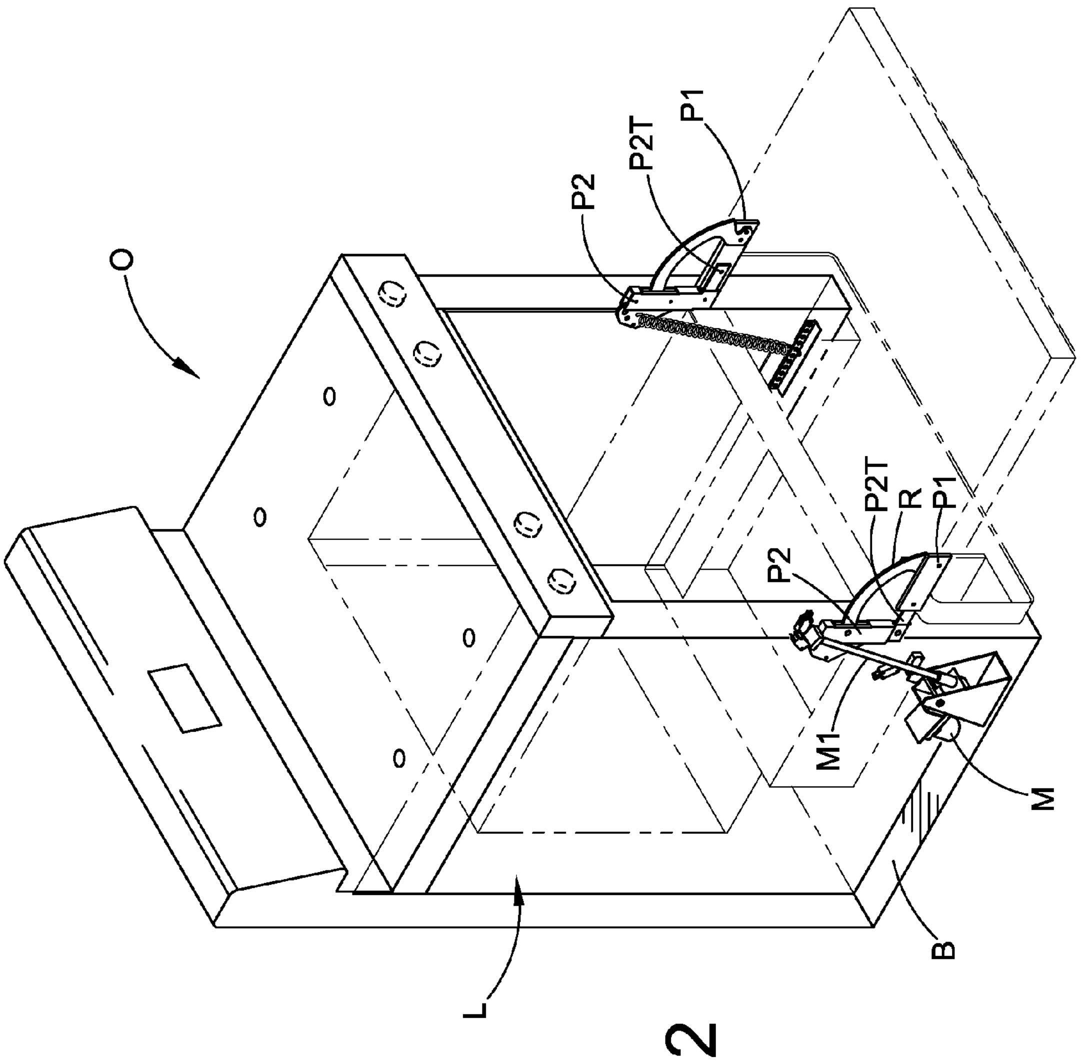
FIG. 2 is similar to FIG. 1 but illustrates the oven in a wire-frame or transparent manner so as to reveal hidden components.
Figure 3:
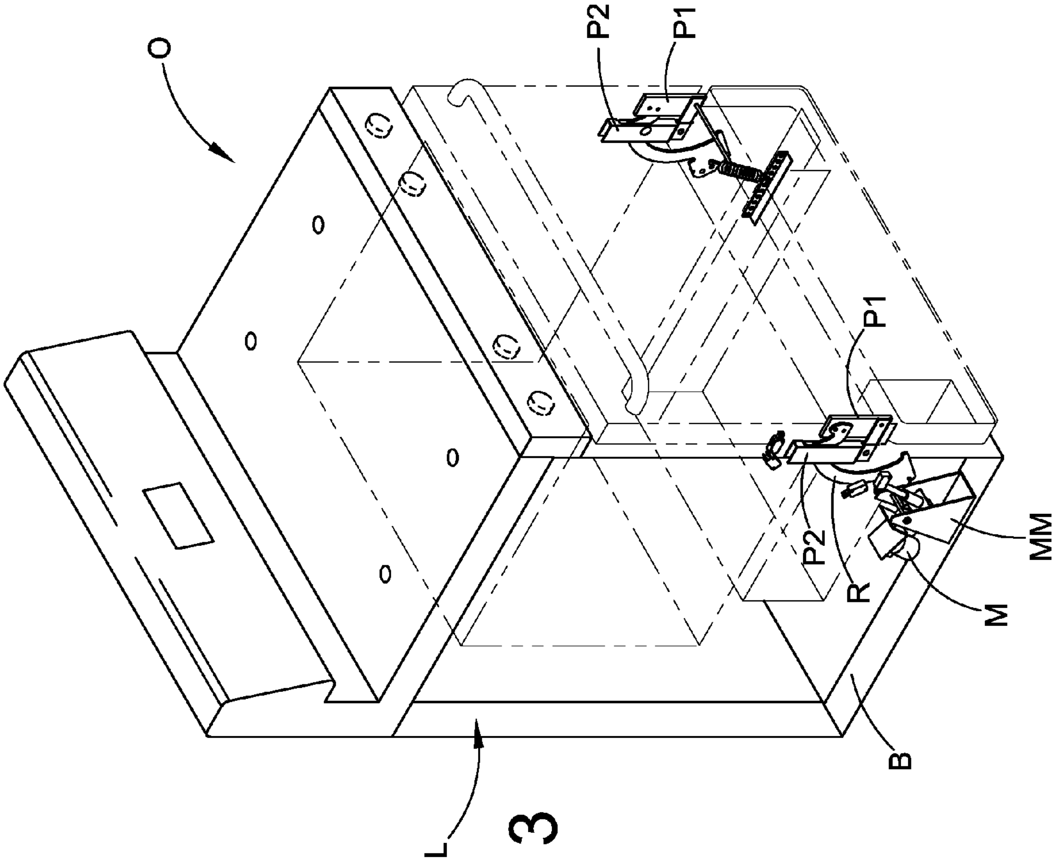
FIG. 3 is similar to FIG. 2 but shows the oven door in its closed position.

Referring also to FIGS. 2 and 3, which are wire-frame or transparent views of the oven O that reveal hidden components, the oven O comprises an electric motor M connected to the body B, preferably located in the space below the cooking chamber C at or near the left side L of the oven O. The motor M is selectively operable in response to user input to pivot the door D from its closed position to a fully (or partially) opened position, and preferably also in the opposite direction, from an opened position to the closed position. The motor M can alternatively be powered pneumatically or hydraulically or can be replaced by a pneumatic or hydraulic cylinder.

With reference also now to FIGS. 4-8, the first (left) and second (right) hinge assemblies H1,H2 each include a first (door mounted) hinge portion P1 fixedly secured to the oven door D and a second (body mounted) hinge portion P2 fixedly secured to the oven body B. The first and second hinge portions P1,P2 are preferably defined from one or more metal stampings or other metal constructions. Each second hinge portion P2 includes a projecting tab P2T to which the respective first hinge portion P2 is pivotally secured by a fastener such as a rivet or the like.

The motor M comprises an output actuator M1 that is operatively coupled through the hinge assembly H1 to the door D in order for the motor to pivot the door D relative to the body B as described. In the illustrated embodiment, the first hinge assembly H1 comprises a door control arm R. Preferably, as shown herein, the door control arm R is connected to or defined as part of the first hinge portion P1 of the hinge assembly H1. Alternatively, the door control arm R can be connected directly to the door D or indirectly to the door through another component, and in either of these alternative cases it is also connected to the hinge assembly H1, albeit through the door D. Those of ordinary skill in the art will recognize that movement of the door control arm R in a first direction that is upward and forward will result in pivoting movement of the door D from its closed position toward an opened position, and movement of the door control arm R in the opposite direction downward and rearward will pivot the door D back toward its closed position.

Figure 7:
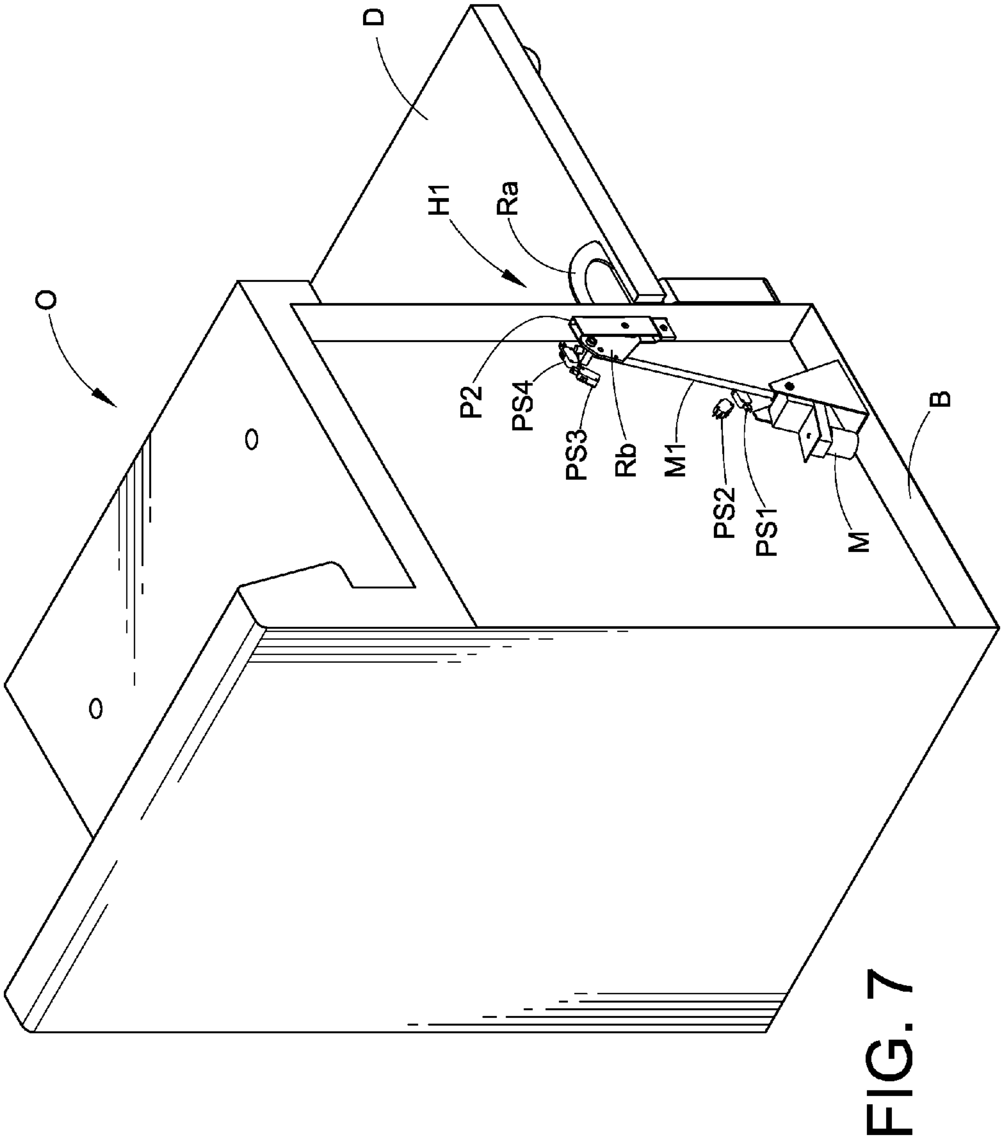
Figure 8:
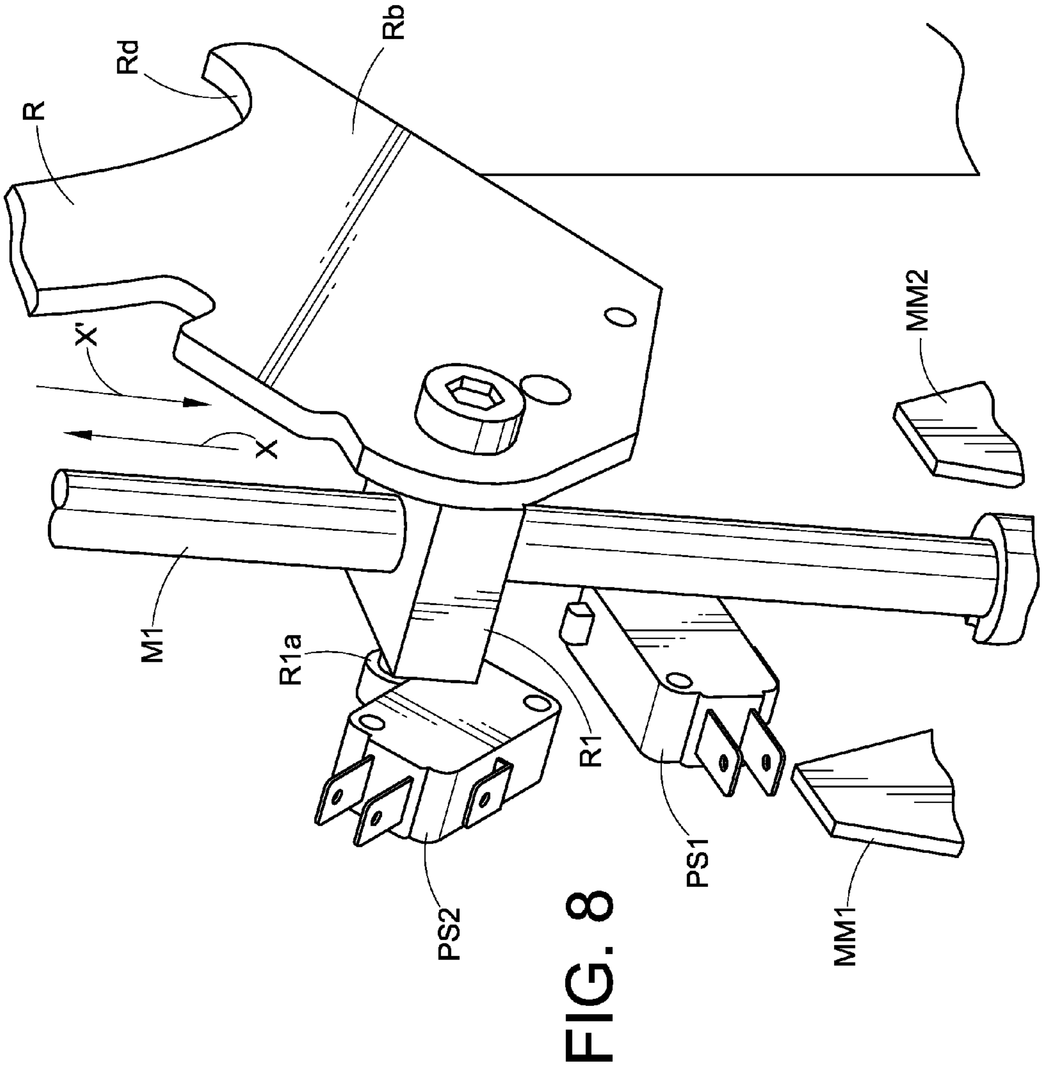
FIG. 8 is a greatly enlarged partial isometric view that shows the operative coupling of the motor actuator to the door control arm, along with related position switches.

With continuing reference to FIGS. 4-8, the output actuator M1 of the motor is operatively coupled to the control arm R by a suitable linkage or coupling, depending upon the action of the actuator, e.g., linear or rotational. The motor M can be fixed in a position or pivotally connected to the oven body B as desired or required. As shown herein, the oven O comprises a motor mount MM including first and second walls MM1, MM2 between which the motor M is located and to which the motor is pivotally secured. In the illustrated embodiment, the actuator M1 comprises a threaded shaft and the motor M drives the actuator M1 rotationally in first and second opposite directions depending upon electrical control input to the motor M. A mating threaded coupler R1 (FIG. 8) is pivotally connected to the control arm R and is threadably mated with the actuator M1. The threaded actuator M1 and mating coupler R1 cooperate to define a "lead screw" actuator. Bearings can be included at the threaded interface between the coupler R1 and actuator M1 to reduce friction. As also shown in FIG. 8, rotation of the actuator M1 in a first direction by the motor M results in translation of the threaded coupler R1 and control arm R in a first direction X (with resulting pivoting movement of the door D from the closed position to an opened position), and rotation of the actuator M1 in a second direction by the motor results in translation of the threaded coupler R1 and control arm R in a second direction X' (with resulting pivoting movement of the door D from an opened position toward the closed position).

In the illustrated embodiment, the second hinge portion P2 of each hinge assembly H1,H2 includes first and second spaced apart walls W1,W2 between which the door control arm R extends with little clearance so that the walls W1,W2 help to stabilize and guide movement of the door control arm R. The second hinge portion P2 of further comprises an arm control member N (shown in broken lines in FIG. 1B and FIG. 4 due to its hidden location between the walls W1,W2 of the second hinge portion P2) such as a roller or a non-rotatable bushing or slide secured between the walls W1,W2 and positioned so that the control arm R will be in contact therewith and "ride" thereon, for at least some and preferably for all positions/movement of the door control arm R. Contact of the control arm R with the roller N stabilizes the door control arm R during its movement. The door control arm R includes first and second ends Ra,Rb. The first end Ra is located adjacent the oven door D and the second end Rb is spaced from the oven door D. The second end Rb includes/defines a recess or dwell point Rd that engages the roller or other arm control member N to define a stop that limits maximum movement of the control arm R in the door-opening direction at the fully opened position for the door D as shown in FIG. 7. Instead of passing between first and second walls W1,W2 of the second hinge portion P2 of hinge assembly H1, the door control arm R can lie adjacent the second hinge portion P2, in which case the roller or other control member N is relocated accordingly so as to be engaged by the door control arm R. The door control arm R is preferably also defined as a metal stamping and is elongated and curved so that when the door D is closed, the door control arm extends inwardly and downwardly to its second end Rb.

The door D is preferably also manually movable by a user without input from the motor M. The motor M is preferably designed to rest in a neutral state so that when a user manually moves the door, the resulting movement of the control arm R and coupler R1 causes rotation of the motor actuator M1, i.e., the motor is manually back-driven by the user manual input force. In an alternative embodiment, the door D is automatically decoupled from the control arm R by a latching mechanism when the user manually pulls the door D from the closed position toward an opened position, so that the door is then freely movable and decoupled from the control arm R and motor actuator M1 until the door D is manually closed to recouple the door to the door control arm R. In another embodiment, as shown herein, an optional clutch mechanism CT (FIG. 4) is provided between the motor M and actuator M1, and the clutch disengages the motor actuator M1 from the motor M when the oven door D is moved manually so as to allow movement of the control arm R and resulting back-driven rotation of the motor actuator M1 in first and second directions when the door is manually moved without the motor M being back-driven by the actuator M1. As such, those of ordinary skill in the art will recognize that the clutch operatively couples the motor M to the actuator M1 and permits relative movement between the actuator M1 and the motor M in response to manual movement of the first hinge portion and the door control arm R.

Figure 4:
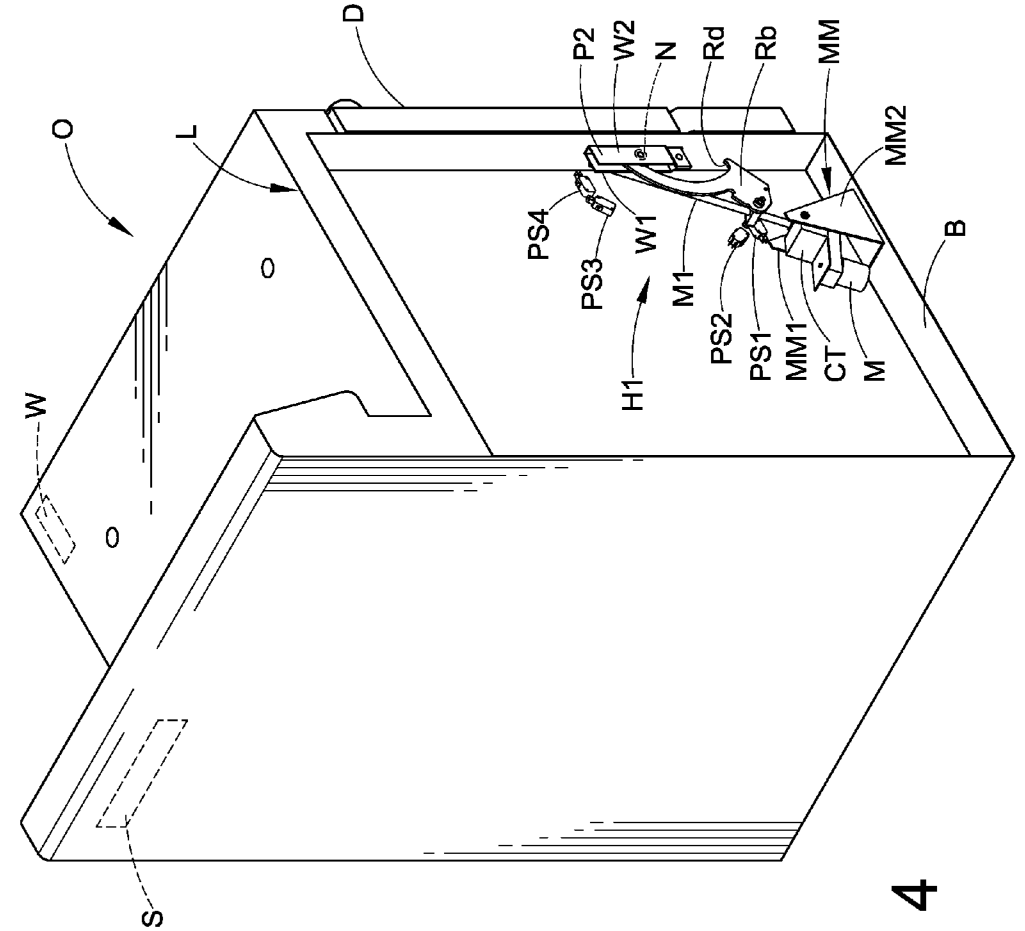
FIGS. 4-7 are left side isometric views of the oven of FIG. 1 with the door located in its closed, broil, substantially opened, and fully opened positions, respectively, all with the left side panel of the oven removed or made transparent to reveal components of the motorized hinge system.
Figure 5:
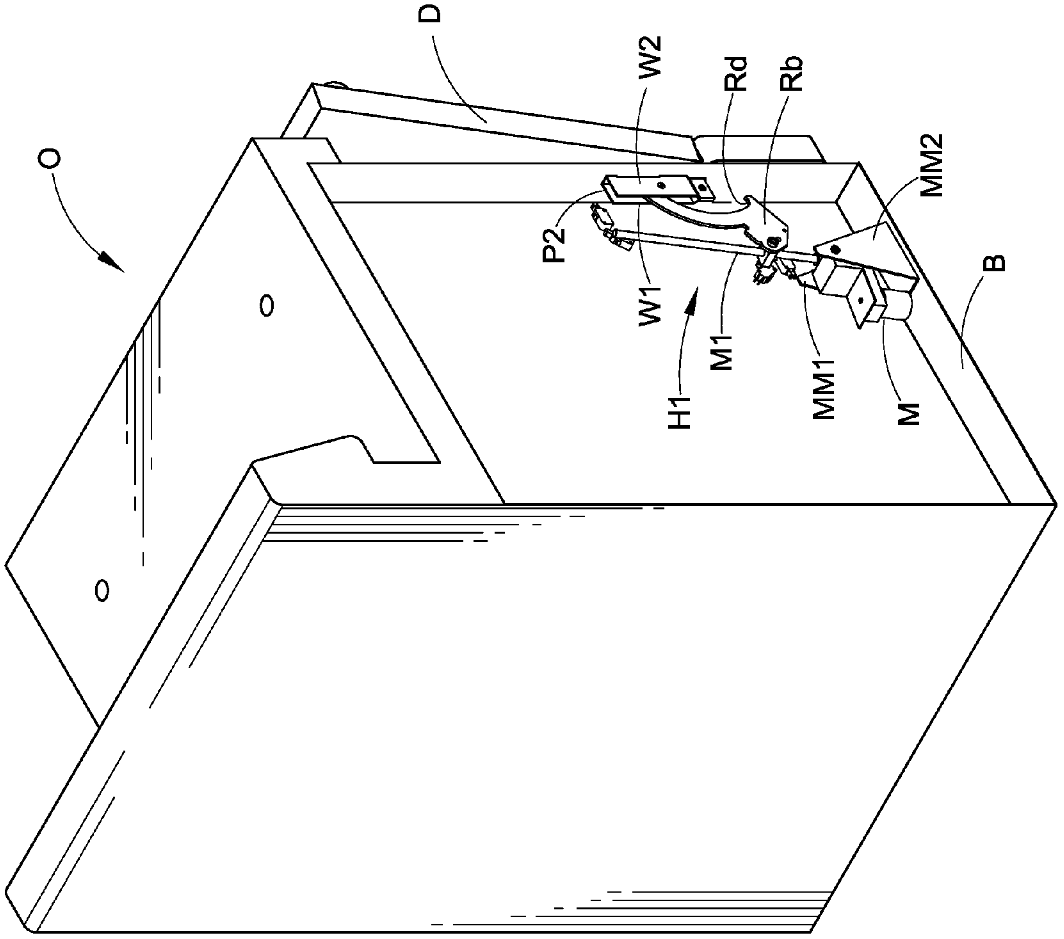
Figure 6:
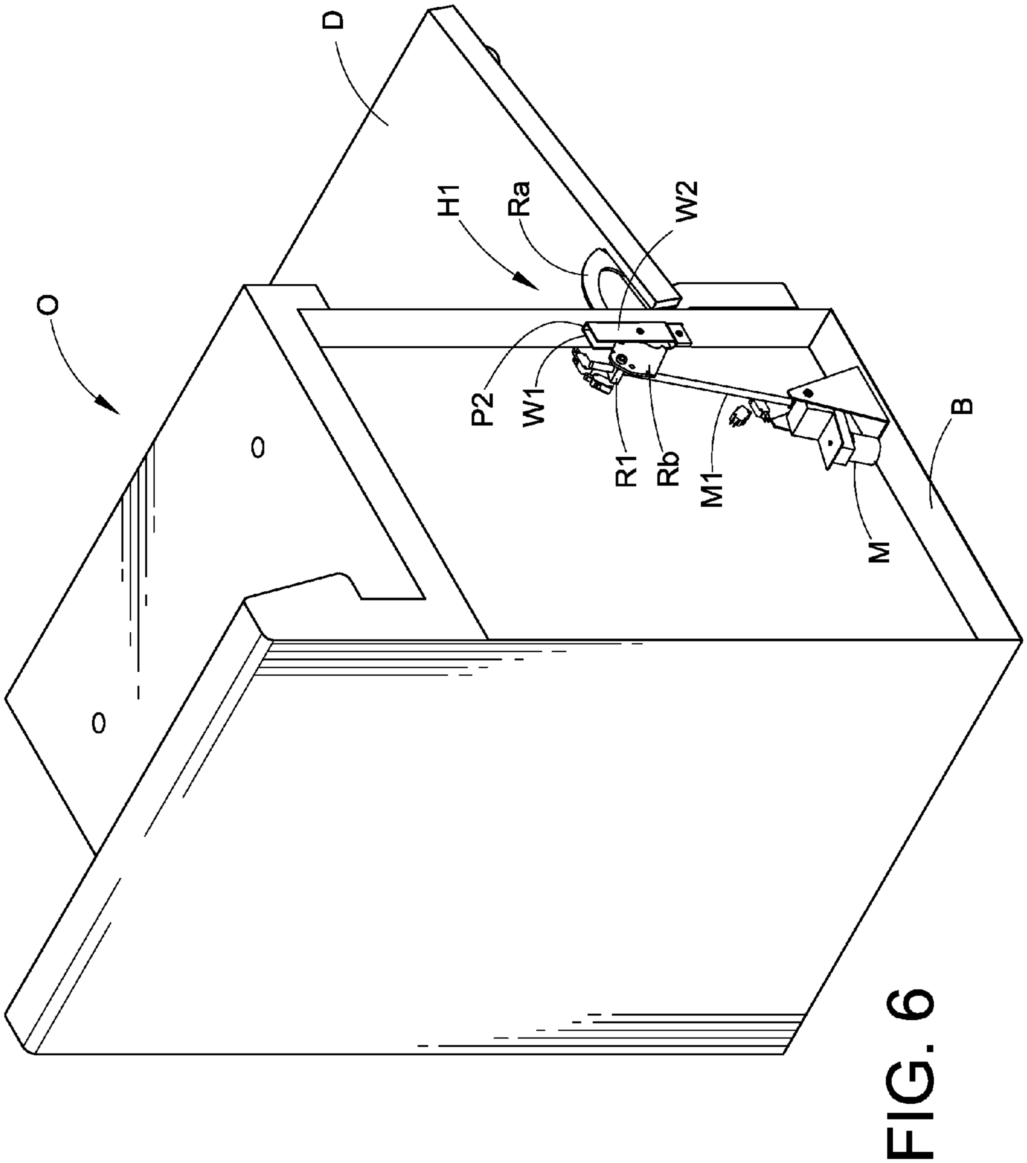

As also shown in FIG. 4, the appliance O comprises an electrical control system S such as a microprocessor control system that is operatively connected to and controls the motor M. The appliance O further comprises a user input switch W connected to or provided as part of the control system S. The user input switch W receives input from a user to control the motor M for opening and closing the door D. The switch W is operable to provide input to the control system S in order to open the door D fully or partially and/or to close the door. The switch W can take different suitable forms such as a mechanical toggle switch or push-button switch, a voice-activation switch, a foot-pedal switch or any other suitable switch, including a wireless input switch that receives infrared or radio frequency signals from a remote transmitter held by a user or otherwise remotely located. It is preferred that the user input switch W provides a capability for a user to input at least two different commands to the control system S that are then used by the control system S to control the motor M: (i) an OPEN command to open the door D fully; and (ii) a CLOSE command to close the door D fully. In addition, the user input switch W can also allow a user to input a BROIL command to move the door D to a partially opened position for broiling.

A plurality of position switches PS1, PS2, PS3, PS4 are physically connected to the oven body and electrically operatively connected to the control system S and are positioned to be selectively activated by a lobe or other projection R1*a* of the coupler R1 that operatively couples the door control arm R to the motor actuator screw M1 (see e.g., FIG. 8 wherein the switch PS2 is being activated by the projection R1*a*). When activated by the coupler projection R1*a*, the switches PS1, PS2, PS3, PS4 respectively indicate to the control system S that the door is in the fully closed, broil (e.g., 10 degrees from closed/vertical), substantially opened (e.g., 80 degrees from closed/vertical) and fully opened positions (e.g., 90 degrees from closed/vertical), respectively. The substantially opened position as shown and described herein is merely an optional reference position that provides feedback to the control system S that the opening door is nearing the fully opened position.

In one embodiment, the control system S monitors the state of the position switches PS1-PS4 and the state of the motor M, e.g., voltage and/or current levels and/or revolutions per minute (RPM), as a means for safety feedback. In this manner, the control system S, which is preferably microprocessor-based, is able to sense when the door D is being impeded from opening or closing under force of the motor M, which might be the result of an unsafe condition, i.e., the door contacting a user or other obstacle. In such case, the control system S is programmed to reverse or stop actuation of the motor M. The optional clutch mechanism CT that drivingly couples the motor to the motor actuator M1 is another safety feature that limits the force that the motor M can exert on the door D, to prevent damage to the appliance O and/or to prevent injury or other damage, i.e., the clutch CT slips or otherwise disengages if movement of the door D is obstructed.

Figure 9:
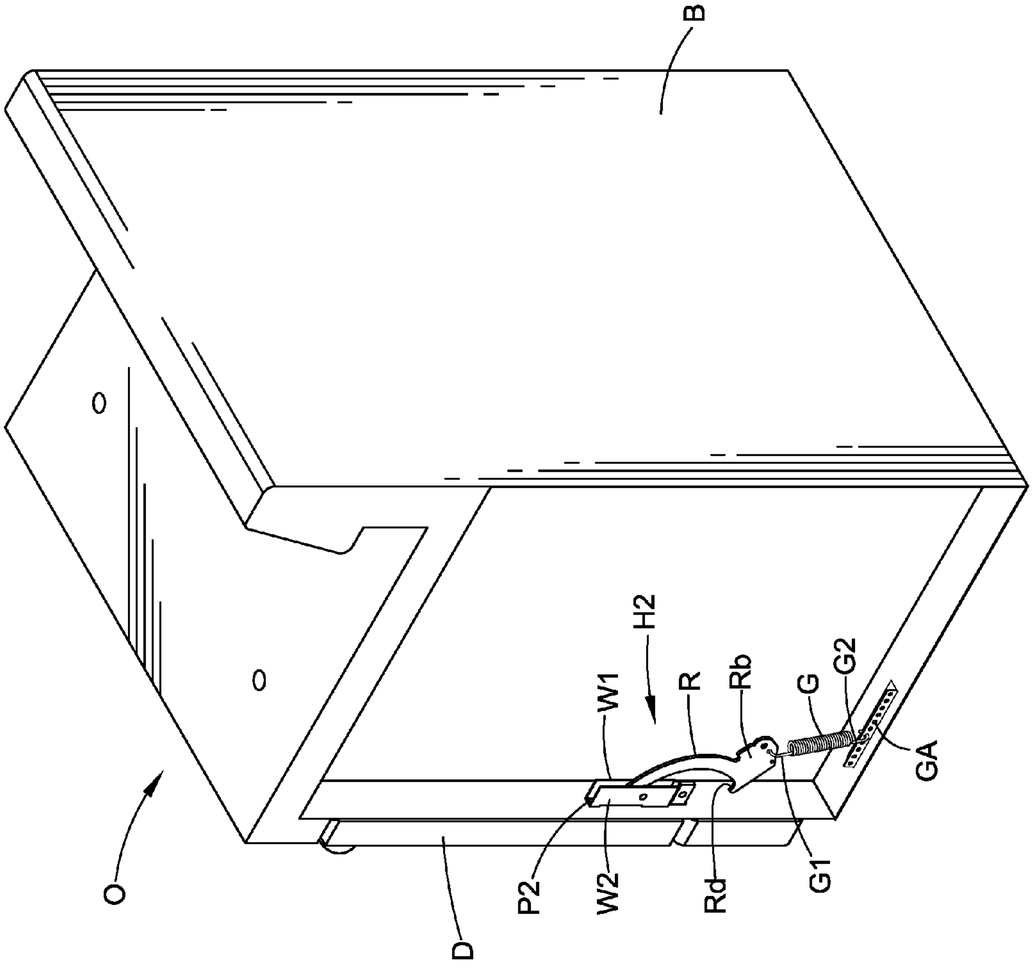
FIG. 9 is a right side isometric view of the oven with the right side panel removed or made transparent to reveal the right side hinge assembly portion of the motorized hinge system, with the oven door in its closed position.
Figure 10:
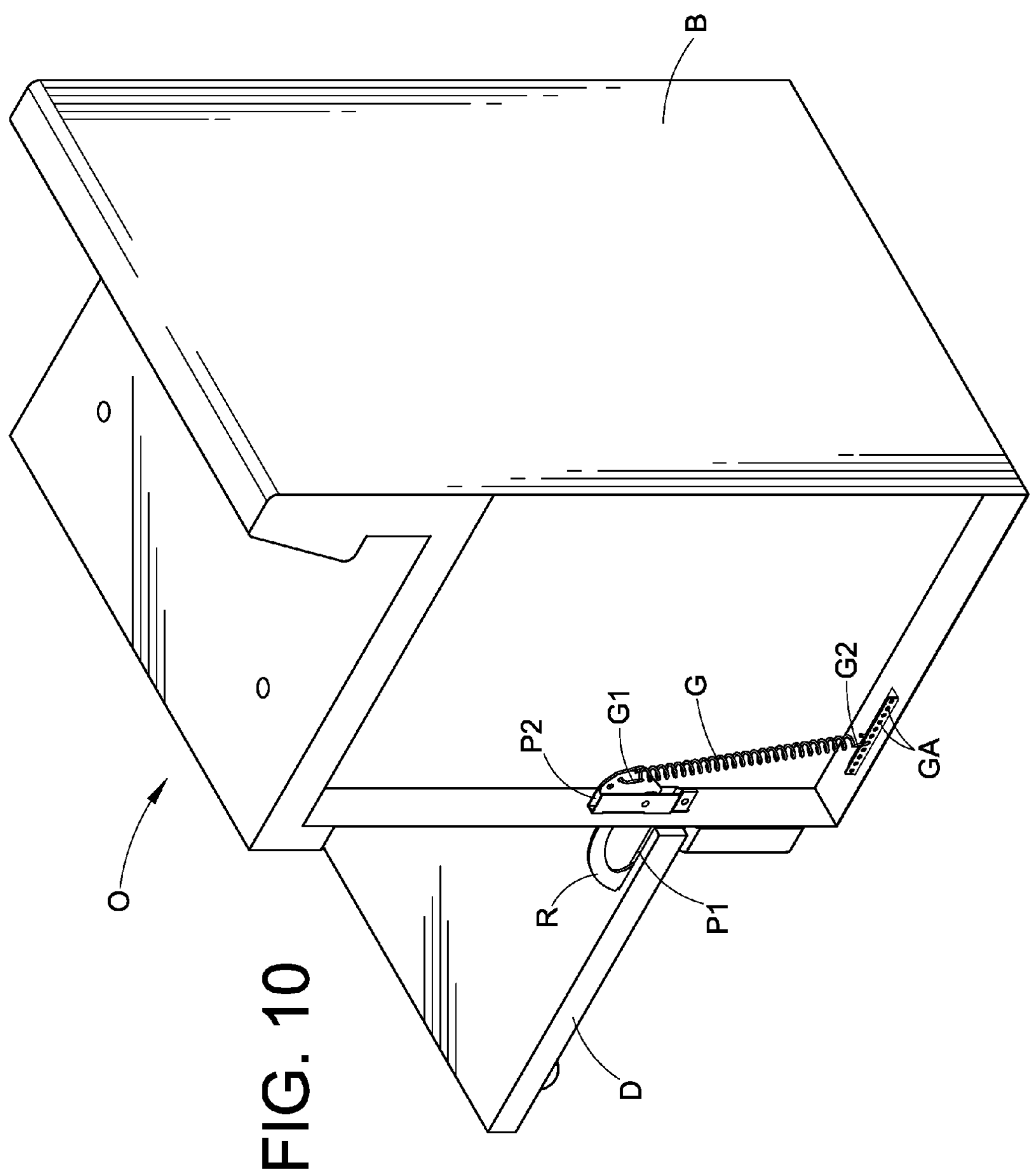
FIG. 10 is similar to FIG. 9 but shows the oven door in an opened position.

The right hinge assembly H2 can be a duplicate of the left hinge assembly H1, including the motor M and related components. It is preferred, however, as shown herein that the right hinge assembly H2 be a manual (unpowered) hinge assembly that helps to support the door D and that provides some counterbalance to the weight of the door. As shown herein, portions of the hinge assembly H2 are (but need not be) identical to the hinge assembly H1. For this reason, like components relative to the hinge assembly H1 are identified with the same reference characters. The hinge assembly H2 does not include a motor. Instead, as shown in FIGS. 9 and 10, a tension coil spring G is used in place of the motor and includes a first end G1 connected to the second end Rb of the door control arm R and second end G2 connected to the oven body, preferably to one of a plurality of different spring anchor location apertures GA depending upon the pretension desired/required in the spring G, i.e., the tension of the spring G is adjusted depending upon the anchor location GA to which the spring second end G2 is anchored. A comparison of FIGS. 9 and 10 shows how the hinge assembly H2 operates, with the spring G being elongated and tensioned in response to movement of the oven door D from the closed position (FIG. 9) to or toward an opened position (FIG. 10). As such, the spring G acts as a counterweight that facilitates movement of the door from the opened to or toward the closed position to aid the motor in moving the door in the closing direction, which allows for use of a smaller motor M which lowers cost, improved efficiency, and increases safety. The spring G can be omitted if desired or replaced by other counterweight or biasing means that exerts a biasing force on the door control arm R (and thus the door D) toward the closed position. A dampening device such as a gas cylinder can be added and connected between the arm R of the second hinge assembly H2 and the body B or the spring G can be replaced by a combined gas cylinder/spring or "gas spring."

The invention has been described with reference to preferred embodiments. Of course, modifications and alterations will occur to others upon a reading and understanding of the preceding specification. It is intended that the invention be construed as including all such modifications and alterations.

The invention claimed is:

1. A motorized hinge system for an oven door, said motorized hinge system comprising:

a first hinge portion adapted to be connected to an associated oven door;

a second hinge portion adapted to be connected to an associated oven body, said first portion pivotally connected to said second portion;

a door control arm having a first end connected to said first hinge portion and a second end spaced from the first end;

a coupler pivotally connected to said door control arm;

a motor adapted to be connected to the associated oven body, said motor comprising an actuator that is driven by said motor and operably coupled to said door control arm through said coupler that is pivotally connected to said door control arm, said actuator linearly or rotationally movable in a first direction by said motor to move said door control arm and said first hinge portion in a first direction pivotally relative to the second hinge portion, said actuator movable linearly or rotationally in a second direction by said motor to move said door control arm and said first hinge portion in a second direction pivotally relative to the second hinge portion.

2. The motorized hinge system as set forth in claim 1, wherein said first end of said door control arm is connected directly to said first hinge portion.

3. The motorized hinge system as set forth in claim 2, wherein said door control arm comprises an elongated curved portion that extends between said first and second ends, said door control arm located adjacent said second hinge portion, said second hinge portion comprising an arm control member connected thereto on which said door control arm rides when said first hinge portion is pivoted relative to said second hinge portion.

4. The motorized hinge system as set forth in claim 3, wherein said second end of said door control arm comprises a dwell point in which said arm control member is seated when said first hinge portion is fully pivoted away from said second hinge portion.

5. The motorized hinge system as set forth in claim 3, wherein said second hinge portion comprises first and second spaced-apart walls between which said arm control member is secured, said door control arm extending between said first and second walls of said second hinge portion.

6. A motorized hinge system for an oven door, said motorized hinge system comprising:

a first hinge portion adapted to be connected to an associated oven door;

a second hinge portion adapted to be connected to an associated oven body, said first portion pivotally connected to said second portion;

a door control arm having a first end connected to said first hinge portion and a second end spaced from the first end;

a motor adapted to be connected to the associated oven body, said motor comprising an actuator that is driven by said motor and operably coupled to said door control arm, said actuator movable in a first direction by said motor to move said door control arm and said first hinge portion in a first direction pivotally relative to the second hinge portion, said actuator movable in a second direction by said motor to move said door control arm and said first hinge portion in a second direction pivotally relative to the second hinge portion, wherein the actuator is a threaded rod rotated in first and second directions by said motor, and wherein said door control arm is operatively coupled to said threaded rod by a threaded coupler that is secured to said door control arm.

7. The motorized hinge system as set forth in claim 1, further comprising:

a control system operatively connected to said motor to control said motor and movement of said actuator;

a user input switch operatively connected to said control system, said user input switch adapted to receive input from a user that indicates a desired position for the door control arm;

a plurality of position switches operatively connected to said control system and respectively positioned to be activated by said door control arm when said door control arm is moved to a plurality of different positions.

8. The motorized hinge system as set forth in claim 7, wherein said user input switch comprises at least one of a mechanical toggle switch, a mechanical push-button switch, a voice activation switch, a foot-pedal switch and a wireless input switch.

9. The motorized hinge system as set forth in claim 1, further comprising:

a clutch that operatively couples said motor to said actuator, said clutch permitting relative movement between said actuator and said motor in response to manual movement of said first hinge portion and door control arm.

10. The motorized hinge system as set forth in claim 6, wherein said threaded coupler is connected to said second end of said door control arm.

11. The motorized hinge system as set forth in claim 10, wherein said threaded coupler is pivotally connected to said door control arm.

12. An oven comprising:

a body including a cooking chamber;

a door pivotally connected to the body by first and second hinge assemblies and movable between opened and closed positions relative to said cooking chamber;

said first hinge assembly comprising a motorized hinge system comprising:

a first hinge portion connected to the door;

a second hinge portion connected to the oven body, said first portion pivotally connected to said second portion;

a door control arm having a first end connected to said first hinge portion or to said door and a second end spaced from the first end;

a motor connected to the oven body and located in a space beneath said cooking chamber, said motor comprising an actuator that is driven by said motor and operably coupled to said door control arm through a coupler pivotally connected to said door control arm, said actuator movable linearly or rotationally in a first direction by said motor to move said door control arm and said door in a first direction pivotally relative to the body, said actuator movable linearly or rotationally in a second direction by said motor to move said door control arm and said door in a second direction pivotally relative to the body.

13. The oven as set forth in claim 12, wherein said second hinge assembly comprises:

a first hinge portion connected to the door;

a second hinge portion connected to the oven body, said first portion of said second hinge assembly pivotally connected to said second portion of said second hinge assembly;

a spring that biases said first hinge portion of said second hinge assembly toward said second hinge portion of said second hinge assembly so that said door is biased toward said closed position.

14. The oven as set forth in claim 13, wherein said second hinge assembly further comprises:

a door control arm having a first end connected to said first hinge portion of said second hinge assembly or to said door, wherein said spring is connected at a first end to said door control arm.

15. The oven as set forth in claim 14, wherein said spring is a coil tension spring having a second end connected to said body.

16. The oven as set forth in claim 15, wherein said body comprises a plurality of different anchor locations for said second end of said spring wherein tension of said spring is adjusted depending upon the anchor location to which said second end of said spring is anchored.

* * * * *